United States Patent
Pistoia et al.

(10) Patent No.: US 10,726,357 B2
(45) Date of Patent: *Jul. 28, 2020

(54) CROSS-PLATFORM PROGRAM ANALYSIS USING MACHINES LEARNING BASED ON UNIVERSAL FEATURES

(71) Applicant: INTERNATIONAL BUSINESS MACHINES CORPORATION, Armonk, NY (US)

(72) Inventors: Marco Pistoia, Amawalk, NY (US); Omer Tripp, Bronx, NY (US); Stephen P. Wood, Thornwood, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 611 days.

This patent is subject to a terminal disclaimer.

(21) Appl. No.: 15/244,220

(22) Filed: Aug. 23, 2016

(65) Prior Publication Data

US 2018/0012142 A1 Jan. 11, 2018

Related U.S. Application Data

(63) Continuation of application No. 15/206,808, filed on Jul. 11, 2016.

(51) Int. Cl.
*G06N 20/00* (2019.01)
*G06F 21/56* (2013.01)
*G06F 8/75* (2018.01)

(52) U.S. Cl.
CPC .......... *G06N 20/00* (2019.01); *G06F 21/562* (2013.01); *G06F 21/566* (2013.01); *G06F 8/75* (2013.01)

(58) Field of Classification Search
None
See application file for complete search history.

(56) References Cited

U.S. PATENT DOCUMENTS

| 8,353,040 B2 | 1/2013 | Tahan et al. |
| 8,640,240 B2 | 1/2014 | Sago et al. |

(Continued)

OTHER PUBLICATIONS

Chandramohan, M. et al., "Detection of mobile malware in the wild," Computer, vol. 45, No. 9 (2012) pp. 65-71. (Year: 2012).*

(Continued)

*Primary Examiner* — Kakali Chaki
*Assistant Examiner* — Brian M Smith
(74) *Attorney, Agent, or Firm* — F. Chau & Associates, LLC

(57) ABSTRACT

A method for performing program analysis includes receiving programs of a first platform that have been assigned a first label and programs of the first platform that have been assigned a second label. Each of the programs of the first platform is expressed as platform-independent logical features. A discriminatory model or classifier is trained, using machine learning, based on the expression of the programs of the first platform as platform-independent logical features, to distinguish between programs of the first label and programs of the second label. An unlabeled program of a second platform is received and is expressed as platform-independent logical features. The trained discriminatory model or classifier is used to determine if the unlabeled program warrants the first label or the second label, based on the expression of the unlabeled program as platform-independent logical features.

9 Claims, 5 Drawing Sheets

(56) References Cited

U.S. PATENT DOCUMENTS

| | | |
|---|---|---|
| 8,918,881 B2 | 12/2014 | Bettini et al. |
| 2015/0101055 A1 | 4/2015 | Tang et al. |
| 2016/0080420 A1 | 3/2016 | Ray et al. |
| 2016/0099963 A1 | 4/2016 | Mahaffey et al. |
| 2017/0006045 A1* | 1/2017 | Kivva .................. G06F 21/561 |

OTHER PUBLICATIONS

Chen et al., "Following devil's footprints: cross-platform analysis of potentially harmful libraries on Android and iOS," 2016 IEEE Symposium on Security and Privacy (May 2016) pp. 357-376. (Year: 2016).*

Mohd Shahdi Ahmad, et al., "Comparison Between Android and iOS Operating System in Terms of Security," 2013 8th International Conference on Information Technology in Asia (CITA), pp. 1-4.

Authors et al., Disclosed Anonymously, "Risk Profiling of Smart Mobile Phone Users Based on In-Line Packet Inspection and Policy Control," IP.com No. IPCOM000244687D, Jan. 6, 2016, p. 1-3.

Martinez, E., A Closer Look at MAC OS X Executable and IOS Apps., VirusTotal blog, <blog.virustotal.com/2014/12/a-closer-look-at-mac-os-x-executable.html>posted Dec. 1, 2014, 2 pp. (Year: 2014).

* cited by examiner

| Feature | iOS | Android | Logical |
|---|---|---|---|
| Application accesses contacts | AddressBook.framework<br>AddressBookUI.framework | android.permission.READ_CONTACTS<br>android.permission.WRITE_CONTACTS | USES_CONTACTS |
| Use of Bluetooth | CoreBluetooth.framework | android.permission.BLUETOOTH<br>android.permission.BLUETOOTH_ADMIN | USES_MICROPHONE |
| Use of Microphone | _OBJC_CLASS_$_AVAudioRecorder<br>_AVAudioSessionCategoryPlayAndRecord<br>_AVAudioSessionCategoryRecord<br>_AVAudioSessionModeGameChat<br>_AVAudioSessionModeVideoChat<br>_AVAudioSessionModeVoiceChat<br>_OBJC_CLASS_$_AVCaptureAudioDataOutput | android.permission.RECORD_AUDIO<br>android.hardware.microphone | USES_MICROPHONE |

FIG. 4

CROSS-PLATFORM PROGRAM ANALYSIS USING MACHINES LEARNING BASED ON UNIVERSAL FEATURES

CROSS-REFERENCE TO RELATED APPLICATION

The present application is a Continuation of co-pending U.S. patent application Ser. No. 15/206,808, filed Jul. 11, 2016, the entire contents of which are herein incorporated by reference.

BACKGROUND

1. Technical Field

The present disclosure relates to program analysis and, more specifically, to cross-platform program analysis using machine learning based on universal features.

2. Discussion of Related Art

Program analysis is the examination of computer programs to determine their condition. One popular type of program analysis examines computer programs to determine if they are malicious. However, program analysis may be performed for a wide variety of other purposes, for example, to assess conformance to various requirements and standards.

While it may be possible to manually examine a computer program to determine if the program is suitable for some particular purpose, manual examination may require the efforts of experts and may be time consuming. This may not be practical in cases where a large number of programs must be analyzed.

For example, there are approximately 1.5 million programs available for download on popular app platforms such as Apple, Inc.'s APP STORE or Google Inc.'s GOGGLE PLAY STORE. There are presumably many more programs that never make it to the respective program repositories. Each of these programs may need to be analyzed and thus it may not be practical to perform manual program analysis.

BRIEF SUMMARY

A method for performing program analysis includes receiving a plurality of programs of a first platform that have been assigned a first label. A plurality of programs of the first platform that have been assigned a second label is received. Each of the plurality of programs of the first platform that have been assigned the first label is expressed as a first set of platform-independent logical features. Each of the plurality of programs of the first platform that have been assigned the second label is expressed as a second set of platform-independent logical features. A discriminatory model or classifier is trained, using machine learning, based on the expression of the programs of the first platform that have been assigned the first and second label as the first and second sets of platform-independent logical features, to distinguish between programs of the first label and programs of the second label. An unlabeled program of a second platform, different from the first platform, is received. The unlabeled program is expressed as a third set of platform-independent logical features. The trained discriminatory model or classifier is used to determine if the unlabeled program warrants the first label or the second label, based on the expression of the unlabeled program as the third set of platform-independent logical features.

A first logical extractor may be used to express each of the plurality of programs of the first platform that have been assigned the first label as the first set of platform-independent logical features and to express each of the plurality of programs of the first platform that have been assigned the second label as the second set of platform-independent logical features, and a second logical extractor may be used to express the unlabeled program as the third set of platform-independent logical features. The first logical extractor may be configured for the first platform, and the second logical extractor may be configured for the second platform.

A plurality of programs of the second platform that have been assigned the first label may be received. A plurality of programs of the second platform that have been assigned the second label may be received. Each of the plurality of programs of the second platform that have been assigned the first label may be expressed as a fourth set of platform-independent logical features. Each of the plurality of programs of the second platform that have been assigned the second label may be expressed as a fifth set of platform-independent logical features. The training of the discriminatory model or classifier may further include using machine learning, based on the expression of the programs of the second platform that have been assigned the first and second label as the fourth and fifth sets of platform-independent logical features, to distinguish between programs of the first label and programs of the second label.

Expressing each of the plurality of programs of the first platform that have been assigned the first label or the second label as the first or second set of platform-independent logical features may be performed using a table that correlates a plurality of features of the first platform with a plurality of platform-independent logical features.

The availability of programs of the second platform that have been assigned the first or second label may be limited.

The first label may represent malicious programming and the second label may represent benign programing.

The first label may represent non-conforming programming and the second label may represent conforming programing, with respect to a set of standards.

The first platform may be ANDROID and the second platform may be iOS.

A plurality of programs of a third platform, different from the first and second platforms, that have been assigned the first label may be received. A plurality of programs of the third platform that have been assigned the second label may be received. Each of the plurality of programs of the third platform that have been assigned the first label may be expressed as a sixth set of platform-independent logical features. Each of the plurality of programs of the third platform that have been assigned the second label may be expressed as a seventh set of platform-independent logical features. The training of the discriminatory model or classifier may further include using machine learning, based on the expression of the programs of the third platform that have been assigned the first and second label as the sixth and seventh sets of platform-independent logical features, to distinguish between programs of the first label and programs of the second label.

A plurality of programs of the first platform that have been assigned a third label may be received. Each of the plurality of programs of the first platform that have been assigned the third label may be expressed as an eighth set of platform-independent logical features. The training of the discriminatory model or classifier may further include using machine learning, based on the expression of the programs of the first platform that have been assigned the first, second, and third labels, as the first, second, and eighth sets of platform independent logical features, to distinguish between programs of the first, second, and third labels.

The third platform may be MACINTOSH.

A method for generating a software tool for analyzing a program includes receiving a plurality of programs of a first platform that have been assigned a first label. A plurality of programs of the first platform that have been assigned a second label is received. Each of the plurality of programs of the first platform that have been assigned the first label may be expressed as a first set of platform-independent logical features. Each of the plurality of programs of the first platform that have been assigned the second label may be expressed as a second set of platform-independent logical features. A discriminatory model or classifier is trained, using machine learning, based on the expression of the programs of the first platform that have been assigned the first and second label as the first and second sets of platform-independent logical features, to distinguish between programs of the first label and programs of the second label. The trained discriminatory model or classifier is embedded into a software tool. The software tool is configured to receive an unlabeled program of a second platform, different from the first platform, express the unlabeled program as a third set of platform-independent logical features, and use the trained discriminatory model or classifier to determine if the unlabeled program warrants the first label or the second label, based on the expression of the unlabeled program as the third set of platform-independent logical features.

A first logical extractor may be used to express each of the plurality of programs of the first platform that have been assigned the first label as the first set of platform-independent logical features and to express each of the plurality of programs of the first platform that have been assigned the second label as the second set of platform-independent logical features. A second logical extractor may be used to express the unlabeled program as the third set of platform-independent logical features. The first logical extractor may be configured for the first platform, and the second logical extractor may be configured for the second platform.

A plurality of programs of the second platform that have been assigned the first label may be received. A plurality of programs of the second platform that have been assigned the second label may be received. Each of the plurality of programs of the second platform that have been assigned the first label may be expressed as a fourth set of platform-independent logical features. Each of the plurality of programs of the second platform that have been assigned the second label may be expressed as a fifth set of platform-independent logical features. The training of the discriminatory model or classifier may further include using machine learning, based on the expression of the programs of the second platform that have been assigned the first and second label as the fourth and fifth sets of platform-independent logical features, to distinguish between programs of the first label and programs of the second label.

A plurality of programs of a third platform, different from the first and second platforms, that have been assigned the first label, may be received. A plurality of programs of the third platform that have been assigned the second label may be received. Each of the plurality of programs of the third platform that have been assigned the first label may be expressed as a sixth set of platform-independent logical features. Each of the plurality of programs of the third platform that have been assigned the second label may be expressed as a seventh set of platform-independent logical features. The training of the discriminatory model or classifier may further include using machine learning, based on the expression of the programs of the third platform that have been assigned the first and second label as the sixth and seventh sets of platform-independent logical features, to distinguish between programs of the first label and programs of the second label.

A plurality of programs of the first platform that have been assigned a third label may be received and each of the plurality of programs of the first platform that have been assigned the third label may be expressed as an eighth set of platform-independent logical features. The training of the discriminatory model or classifier may further include, using machine learning, based on the expression of the programs of the first platform that have been assigned the first, second, and third labels, as the first, second, and eighth sets of platform independent logical features, to distinguish between programs of the first, second, and third labels.

A system for performing program analysis includes a first logical extractor configured to receive a plurality of programs of a first platform that have been assigned a first label, receive a plurality of programs of the first platform that have been assigned a second label, express each of the plurality of programs of the first platform that have been assigned the first label as a first set of platform-independent logical features, and express each of the plurality of programs of the first platform that have been assigned the second label as a second set of platform-independent logical features. A computer learning trainer is configured to train a discriminatory model or classifier, using machine learning, based on the expression of the programs of the first platform that have been assigned the first and second label as the first and second sets of platform-independent logical features, to distinguish between programs of the first label and programs of the second label. A second logical extractor is configured to receive an unlabeled program of a second platform, different from the first platform, and express the unlabeled program as a third set of platform-independent logical features. A software tool, executed on a computer system, for analyzing a program, is configured to use the trained discriminatory model or classifier to determine if the unlabeled program warrants the first label or the second label, based on the expression of the unlabeled program as the third set of platform-independent logical features. An application repository stores a plurality of applications for the second platform. The application repository is configured to have the software tool analyze each of the plurality of applications stored therein.

A mobile electronic device, of the second platform, may have one or more applications installed thereon. The mobile electronic device may be configured to have the software tool analyze each of the plurality of applications stored thereon.

A computer system includes a processor and a non-transitory, tangible, program storage medium, readable by the computer system, embodying a program of instructions executable by the processor to perform method steps for performing program analysis. The method includes receiving a plurality of programs of a first platform that have been assigned a first label, receiving a plurality of programs of the first platform that have been assigned a second label, expressing each of the plurality of programs of the first platform that have been assigned the first label as a first set of platform-independent logical features, expressing each of the plurality of programs of the first platform that have been assigned the second label as a second set of platform-independent logical features, training a discriminatory model or classifier, using machine learning, based on the expression of the programs of the first platform that have been assigned the first and second label as the first and second sets of platform-independent logical features, to distinguish between programs of the first label and programs of the second label, receiving an unlabeled program of a second platform, different from the first platform, expressing the unlabeled program as a third set of platform-independent logical features, and using the trained discriminatory model or classifier to determine if the unlabeled program warrants the first label or the second label, based on the expression of the unlabeled program as the third set of platform-independent logical features.

A first logical extractor may be used to express each of the plurality of programs of the first platform that have been assigned the first label as the first set of platform-independent logical features and to express each of the plurality of programs of the first platform that have been assigned the second label as the second set of platform-independent logical features, and a second logical extractor is used to express the unlabeled program as the third set of platform-independent logical features. The first logical extractor may be configured for the first platform, and the second logical extractor may be configured for the second platform.

A plurality of programs of the second platform that have been assigned the first label may be received. A plurality of programs of the second platform that have been assigned the second label may be received. Each of the plurality of programs of the second platform that have been assigned the first label may be expressed as a fourth set of platform-independent logical features. Each of the plurality of programs of the second platform that have been assigned the second label may be expressed as a fifth set of platform-independent logical features. The training of the discriminatory model or classifier may further include using machine learning, based on the expression of the programs of the second platform that have been assigned the first and second label as the fourth and fifth sets of platform-independent logical features, to distinguish between programs of the first label and programs of the second label.

The first label may represent malicious programming and the second label represents benign programing.

A plurality of programs of a third platform, different from the first and second platforms, that have been assigned the first label may be received. A plurality of programs of the third platform that have been assigned the second label may be received. Each of the plurality of programs of the third platform that have been assigned the first label may be expressed as a sixth set of platform-independent logical features. Each of the set of programs of the third platform that have been assigned the second label may be expressed as a seventh set of platform-independent logical features. The training of the discriminatory model or classifier may further include using machine learning, based on the expression of the programs of the third platform that have been assigned the first and second label as the sixth and seventh sets of platform-independent logical features, to distinguish between programs of the first label and programs of the second label.

A plurality of programs of the first platform that have been assigned a third label may be received and each of the plurality of programs of the first platform that have been assigned the third label may be expressed as an eighth set of platform-independent logical features. The training of the discriminatory model or classifier may further include using machine learning, based on the expression of the programs of the first platform that have been assigned the first, second, and third labels, as the first, second, and eighth sets of platform independent logical features, to distinguish between programs of the first, second, and third labels.

BRIEF DESCRIPTION OF THE SEVERAL VIEWS OF THE DRAWINGS

A more complete appreciation of the present disclosure and many of the attendant aspects thereof will be readily obtained as the same becomes better understood by reference to the following detailed description when considered in connection with the accompanying drawings, wherein:

FIG. 4 is a table illustrating various logical extractors in accordance with exemplary embodiments of the present invention.

DETAILED DESCRIPTION

Figure 1:
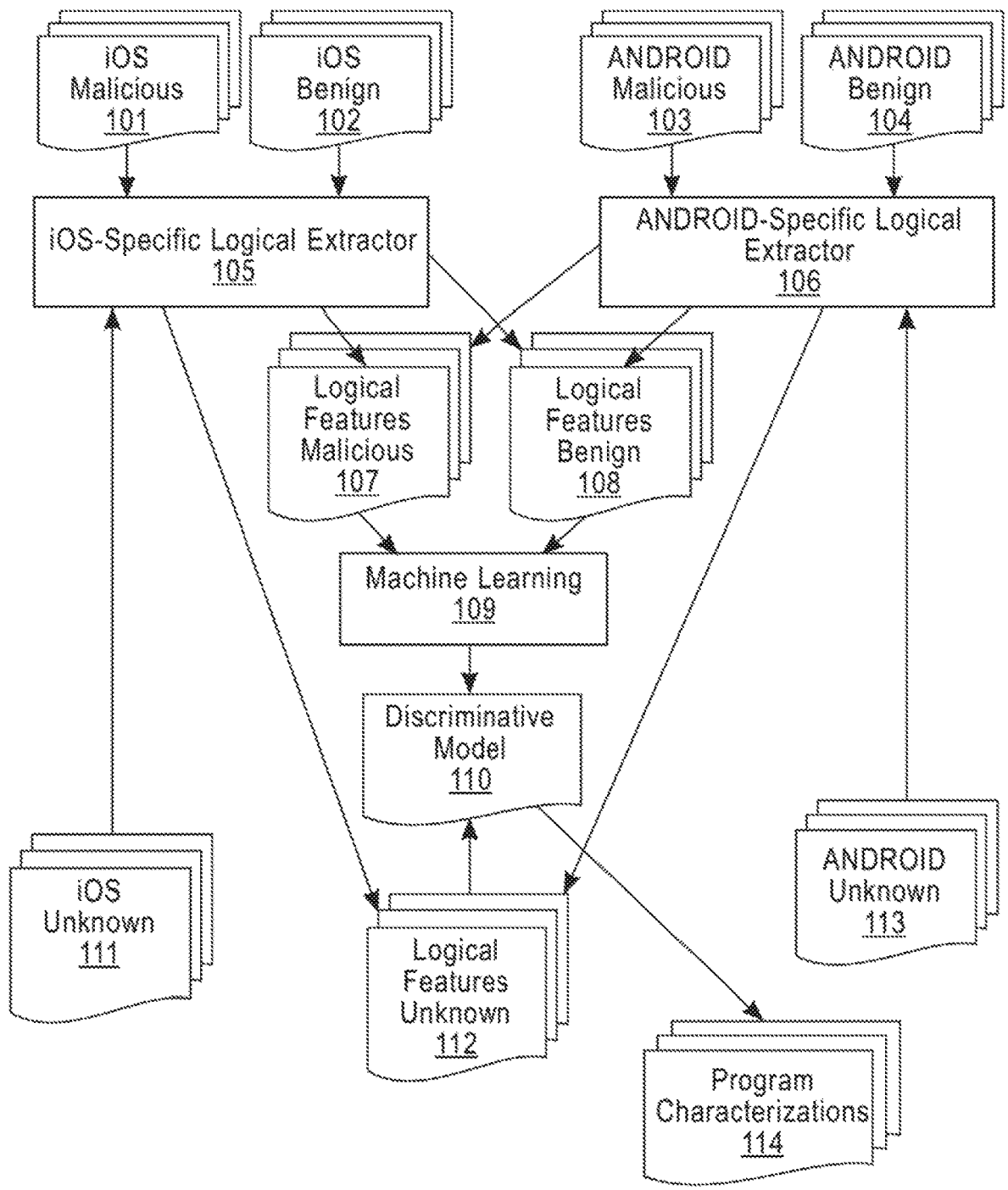
FIG. 1 is a schematic diagram illustrating an approach for performing cross-platform program analysis in accordance with exemplary embodiments of the present invention.

In describing exemplary embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Exemplary embodiments of the present invention provide a system and method for automatically performing program analysis, such as to determine whether a given program is malicious. Malicious programs are programs that perform some harmful purpose that the user is unaware of, such as damaging hardware or data, capturing sensitive information, using hardware resources to attack or otherwise interfere with other computer systems and services, etc. Some programs, such as adware, may be quasi-malicious by displaying advertisements to the user without the user's permission or knowledge as to the source of the advertisements. Still other programs may be unintentionally detrimental by overtaxing hardware resources such as memory, CPU processing resources, and/or battery life due to poorly implemented coding. Exemplary embodiments of the present invention may automatically perform program analysis on applications for any reason such as those mentioned above. However, for the purpose of keeping a succinct disclosure, exemplary embodiments of the present invention may be described herein as performing program analysis for the purpose of determining whether applications are malicious or not.

Rather than manually analyzing programs, or manually programming a set of rules to determine if an application is malicious, exemplary embodiments of the present invention may utilize machine learning to train classifiers for determining whether an application is malicious or not. In performing machine learning, training data is considered. Here, the training data includes a set of known-good programs that are labeled as such, and a set of known-malicious programs that are labeled as such. Given sufficient training data, machine learning may be used to train a model for distinguishing between good and malicious programs based on the "features" of the programs. In this context, "features" refers to the attributes of the program, for example, API calls, libraries used, manner in which the programs access the internet, or any other characteristics that may be used to distinguish program capabilities from each other or find similarities.

These features are often platform-dependent. For example, an application written for Google Inc.'s ANDROID platform may access a particular URL in a manner that is very specific to the ANDROID platform, and thus, models trained on these platform-dependent features may not be effective in determining if an application written for Apple Ins.'s iOS is malicious.

Training a model for distinguishing between malicious and benign programs may be particularly challenging for certain platforms that include very few malicious programs. At the same time, as mentioned in the above example, models that have been trained using malicious ANDROID applications may not be effective in identifying malicious iOS applications, as features tend to be platform-specific.

Exemplary embodiments of the present invention provide systems and methods for training models for analyzing programs of a first platform, for example, to identify malicious programs, using training data that includes programs written for a second platform that is different from the first platform. For example, exemplary embodiments of the present invention provide approaches for using malicious and/or benign ANDROID applications to train models for identifying malicious and/or benign iOS applications.

This may be performed by utilizing platform-independent features, referred to herein as "universal features." For example, prior to training the discriminative models, exemplary embodiments of the present invention may utilize an elements referred to herein as a "logical extractor" to identify one of a predetermined set of "logical features" from within each program used in the training data. A "logical feature" is a way of describing each platform-specific feature of the program in terms that are platform-independent. Thus there may be one logical extractor for converting ANDROID applications into sets of logical features, and another logical extractor for converting iOS applications into sets of logical features, but the end result of each extractor will be subsets of the universe of logical features.

As different platforms may have different capabilities and limitations, it is possible that a logical feature from one platform would be analogous to a combination of logical features from another platform. As a "universal feature" is a feature that can be found within both platforms, a universal feature may be one logical feature in one platform and then a plurality of logical features in another platform. Alternatively, there may be no analogous feature in the other platform and so such a logical feature might not be a universal feature at all. Even though exemplary embodiments of the present invention may be principally concerned with the universal features that tend to correspond with malicious/benign applications, in the simplest case, logical features may be universal features, and the feature extractor need not look for those logical features that are neither universal features nor add up to universal features. At least for this reason, and for providing a simplified explanation, exemplary embodiments of the present invention will be explained mainly in terms of logical features, rather than universal features.

By using the logical extractors, each program is converted into a set of logical features from the same universe of logical features. Then, each program, expressed in terms of the same logical features but still being tagged as malicious or benign, may be used to train the discriminative models. After the models have been so-trained, program analysis may be performed by first using the appropriate logical extractor in the program to be analyzed, and then using the trained models on the program expressed in terms of logical features to determine if the program is malicious or benign.

Figure 2:
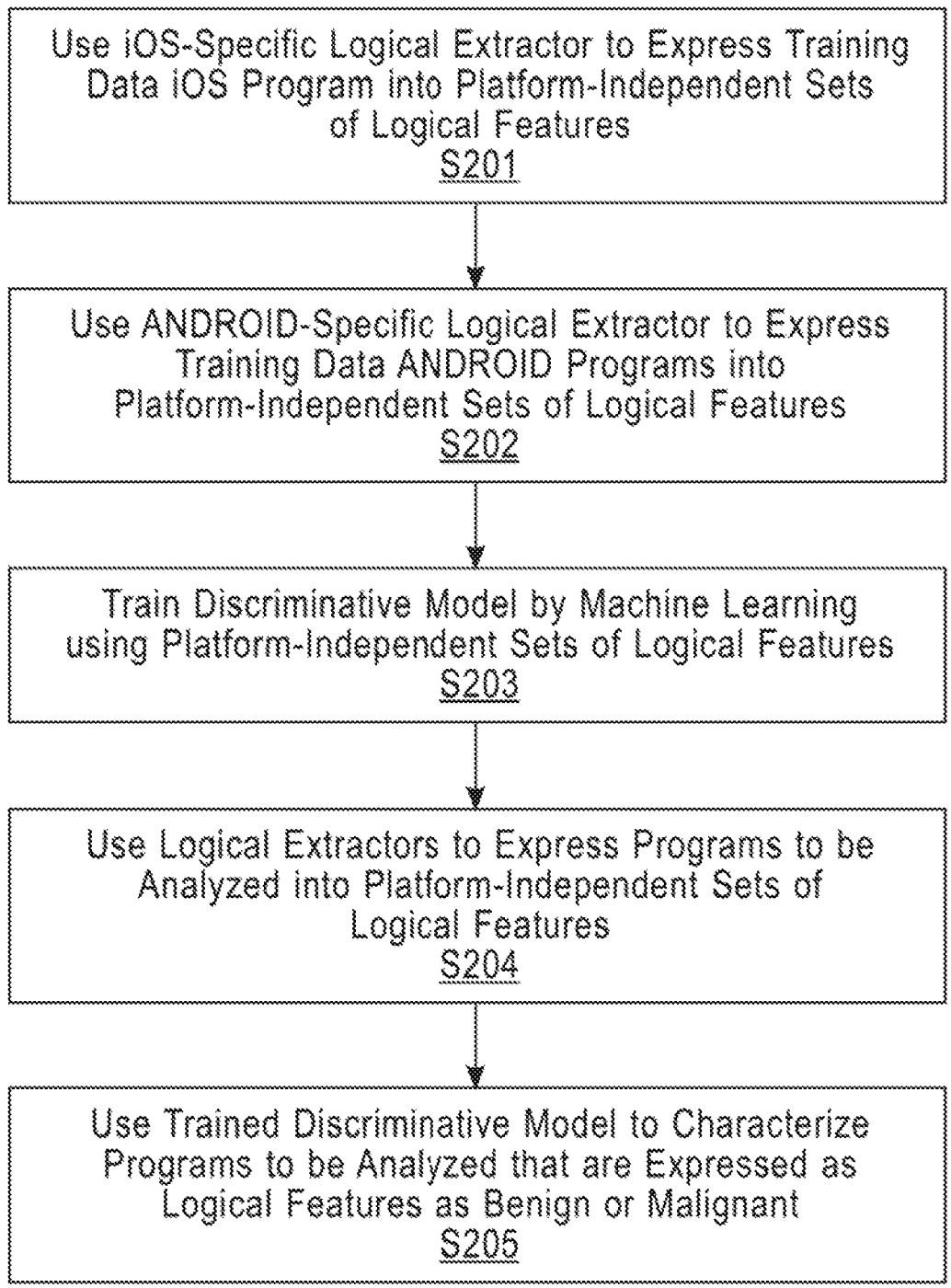
FIG. 2 is a flow chart illustrating an approach for performing cross-platform program analysis in accordance with exemplary embodiments of the present invention.

The above approach may be adapted in various different ways, as will be described in detail below. FIG. 1 is a schematic diagram illustrating an approach for performing cross-platform program analysis in accordance with exemplary embodiments of the present invention. FIG. 2 is a flow chart illustrating the same. According to exemplary embodiments of the present invention, a set of training data may be provided. The training data may include ANDROID applications that are known to be malicious 103 as well as ANDROID applications that are known to be benign 104. The training data may optionally include iOS applications that are known to be malicious 101 and/or iOS applications that are known to be benign 102, however, it is to be understood that such programs, in particular iOS applications that are known to be malicious 101, might not be available at all or might have very limited availability.

Platform-specific logical extractors 105 and 106 may be available. Each logical extractor may be preprogrammed to identify various features within a program for a particular platform and then express each identified feature in a platform-independent manner. For example, an iOS-specific logical extractor 105 may be used to express the iOS training data programs 101 and 102 as platform-independent logical features 107 and 108 (Step S201). The labels of malicious and benign may be maintained by the logical extractor 105 and so the malicious iOS training programs 101 may be transformed to logical features identified as malicious 107 while the benign iOS training programs 102 may be transformed to logical features identified as benign 108.

Similarly, an ANDROID-specific logical extractor 106 may be used to express the ANDROID training data programs 103 and 104 as platform-independent logical features 107 and 108 (Step S202). The labels of malicious and benign may be maintained by the logical extractor 106 and so the malicious ANDROID training programs 103 may be transformed to logical features identified as malicious 107 while the benign ANDROID training programs 104 may be transformed to logical features identified as benign 108.

In extracting logical features, it may be the binary of the application that is analyzed to identify features. However, where available, the source code may be analyzed for features. This analysis may include simulating execution of the binary, however, this simulation may not be required as the features of the application, such as what hardware resources are called by the application, what URLs are contacted by the application, etc. may be identifiable from the binary code. These applications may be referred to as an APK, in the case of ANDROID, or an IPA, in the case of iOS. Both the APK and IPA are essentially packages of multiple files with code, assets, metadata, etc. that are used by the application.

As the code for ANDROID is Java based, names of packages used, methods called, string constants declared, etc. may easily be derived from analyzing the code. For iOS, applications may be compiled/linked binary code that has header structures declaring libraries that are needed by the loader that loads/runs the code, names for methods that are called, symbol tables and constants strings.

For metadata, ANDROID applications have manifests that have version numbers, authors, permissions used, function exposed etc. For iOS, there are pLists that have version numbers, hardware/software features required by the app to ensure it will run on the device before its attempted, etc. These metadata and pLists may be analyzed and features identified therefrom.

Features may also be derived based on assets such as images, video, fonts etc. Thus, features may be derived from assets used, metadata, pLists, binary code, header structures, declared libraries, names for methods called, symbol tables, constants strings, and any other identifying characteristics of the application.

A discriminative model 110 may then be generated by applying machine learning 109 to the labeled platform-independent sets of logical features (Step S203). Once the discriminative model 110 has been so trained, exemplary embodiments of the present invention may be used to analyze programs of unknown labeling (e.g. it is not known whether they are malicious or benign). These programs may be applications found within (or submitted to be included within) an app repository, as discussed above, applications that are installed onto a computer device (such as a smartphone, tablet computer or personal computer), or applications from any other source.

These programs to be tested may include iOS programs 111 and/or ANDROID programs 113, however, according to some exemplary embodiments of the present invention, it is understood that there might only be iOS programs 111 so-tested, and that ANDROID programs 113 may be tested using discriminative models trained directly from labeled android applications 103 and 104.

The iOS programs to be tested 111 may be transformed into logical features of unknown labeling 112 by the iOS-specific logical extractor 105 while the ANDROID programs to be tested 113 may be optionally transformed into logical features of unknown labeling 112 by the ANDROID-specific logical extractor 106 (Step S204). The discriminative model 110 may then be used to label the programs of unknown labeling 111 and/or 113 based on the logical features 112 (Step S205).

Figure 3:
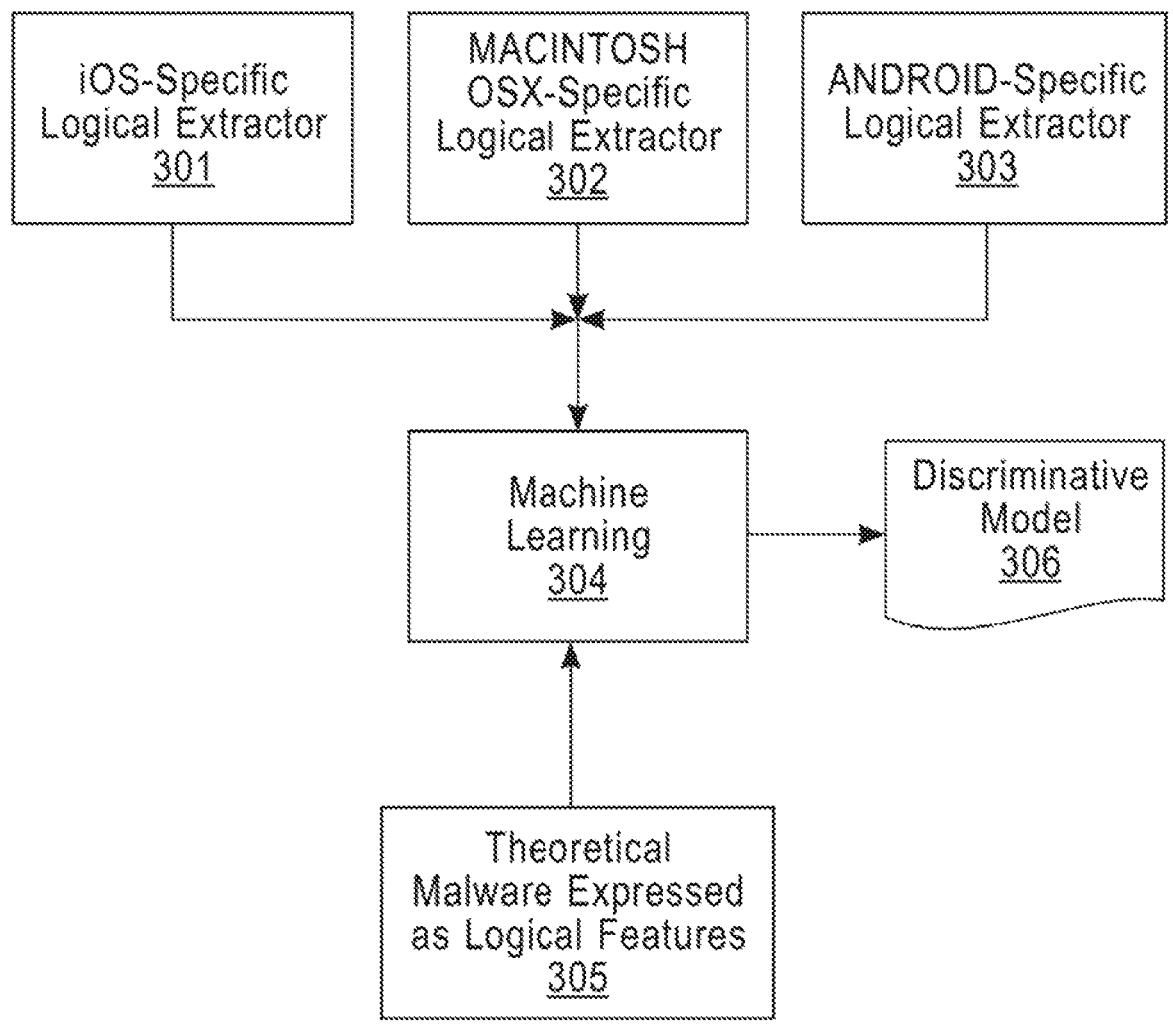
FIG. 3 is a schematic diagram illustrating a multi-platform approach for performing cross-platform program analysis in accordance with exemplary embodiments of the present invention.

As discussed above, exemplary embodiments of the present invention include training discriminatory models with machine learning using ANDROID-based training data that has been converted to platform-independent logical features so that iOS-based programs may be converted to platform-independent logical features and be labeled using the trained discriminatory models. However, exemplary embodiments of the present invention are not limited to these specific platforms. Indeed, as shown in FIG. 3, which is a schematic diagram illustrating a multi-platform approach for performing cross-platform program analysis in accordance with exemplary embodiments of the present invention, applications used for training discriminatory models using machine learning 304 may include iOS applications, which may be converted into logical features using an iOS-specific logical extractor 301, applications for MACINTOSH computer systems, manufactured and sold by Apple Inc., which may be converted into logical features using a MACINTOSH-specific logical extractor 302, ANDROID applications, which may be converted into logical features using an ANDROID-specific logical extractor 303, etc.

The discriminative model 306 may thus be generated using both labeled MACINTOSH applications and labeled ANDROID applications as training data, as each of these platforms may share commonalities with iOS applications, and iOS applications might not be available in sufficient quantities to adequately train the discriminatory model 306.

Moreover, exemplary embodiments of the present invention may further allow for a skilled user to theorize on what types of features may be present in a hypothetical malware for iOS and these features may be expressed as logical features 305 and used as training data for machine learning 304. In this way, a hybrid machine learning approach may be performed.

It is noted that while exemplary embodiments of the present invention have been described herein with reference to determining whether an iOS application is malicious or benign, the invention is not limited to this, and exemplary embodiments of the present invention may be applied to any form of program analysis, not only determining whether an application is benign or malignant, and may be applied to any program platform, not only iOS. Moreover, it is to be understood that while certain platforms are mentioned herein such as iOS, MACINTOSH, and ANDROID, exemplary embodiments of the present invention may be applied to various other platforms such as personal computer operating systems (e.g. MICROSOFT WINDOWS, provided by Microsoft Corporation, CHROME OS, provided by Google Inc., various LINUX distributions, etc.) and/or mobile platforms, and various cross-platform architectures such as MACH-O. Exemplary embodiments of the present invention may be particularly useful in cases in which one particular platform is lacking in availability of labeled examples to be used to train discriminatory models or other machine learning classifiers.

As discussed above, the logical extractors analyze the application code to identify logical features and computer learning is based on the logical features. Examples of these logical features include "access Contacts," "access Internet," "use Bluetooth," "use Microphone," etc. Taking for example, the "access Contacts" feature, ANDROID requires permission to access contacts. In this case the metadata, i.e. the Android manifest, may be examined and the permissions that are listed there as required by the application may be extracted. If "android.permission.READ_CONTACTS" or "android.permission.WRITE_CONTACTS" is found, it can be appreciated that this Android app has the logical feature "USES_CONTACTS" and this value may be set to, say, 1 or true. If these are not found, the "USES_CONTACTS" logical feature value may be set to 0 or false.

In this way, the logical features may be thought of as a key value pairs, where the key above is USES_CONTACTS and its value is 0 or 1. The extracting the permissions is platform specific feature extraction and logical extraction of USES_CONTACTS goes to this set of permissions looking for the permissions for contact access. This analysis may be coded into the logical extractors. Alternatively, the logical extractors may look at the code as well to identify the methods, etc. that are used to access contacts. However, simply using the permissions may be sufficient.

To get to the same logical feature in iOS, the iOS specific logical extractor may do something different. It can look at the binary code file in the header portion and extract a list of all the external libraries that are required (the loader will have to link the app to these when it loads it in order to run it). To determine if the app uses contacts, the iOS logical extractor can look to this list and see if either the "AddressBook.framework" or "AddressBookUI.framework" is one of these libraries. If so, then the iOS app will be assigned a USE_CONTACTS feature with the value of 1. Alternatively, the iOS logical extractor could try to drill down and look for actual methods called, etc. but again, it may be sufficient to look to the lists of external binaries required, extracted from the headers. Whether the logical extractor looks to permissions, methods called, packages used, external libraries linked, etc. is a function of what is programmed into the logical extractor. The logical extractor may use these platform specific features to make its determination. What platform feature(s) are to be looked at will depend on what logical feature is being extracted. The logical extractors may check each program for every known logical feature and then assign a value of 0 or 1 for each possible feature.

For example, a logical feature may be whether a company called XYZ analytics' package is used by the app. It may be assumed, for example, that this analytics package would be used by benign apps but not malicious apps. The company XYZ make a cross-platform analytics package that can be used in Android or iOS apps. The Android logical extractor would look for the calls to the Android implementation while the iOS logical extractor would look for the calls to the iOS implementation. For Android, this might be detected by looking for any classes present in the app from the com.companyXYZ.analytics package for example. In iOS this might be detected as external libraries that is required and listed in the code headers. Accordingly, there may be a feature USES_ANALYTICS_XYZ and computer learning may be used to train and see if this feature is useful in predicting malware or not.

The output from the logical extractor may therefore be a list of logical features along with corresponding values, e.g. 0 for false or 1 for true. Then computer learning may use this list as input, along with its associated label of malicious or benign. However, exemplary embodiments of the present invention are not limited to logical features with binary values. There may be more options. For example, a feature may be a count of non-conditional jumps or branches, and a value for this feature may be assigned, for example, from 0 to 100. Thus, while binary logical features have been discussed, it is to be understood that features may be versatile enough to include integer values, real number values, or even text strings.

However, according to some exemplary embodiments of the present invention, the logical extractors may need to be programmed by hand with knowledge of the way in which various features may appear in both iOS and ANDROID, or whichever other platforms are being analyzed.

Additionally, as previously discussed, the approaches for program analysis discussed herein need not be limited to distinguishing between benign and malignant programs, the discriminative models may be trained to make any sort of differentiation desired between different types of programs.

FIG. 4 is a table illustrating various logical extractors in accordance with exemplary embodiments of the present invention. It is to be understood that this table is presented as a simplified example showing a correspondence of logical features to comparable features in iOS and ANDROID applications. While understanding how a feature may present for the various application platforms may be useful in extracting these features, it is to be understood that feature extraction, for example, as performed by the various platform-specific extractors, may be more complicated than simply scanning code for a particular string, and actual feature extraction may include a process for identifying a given logical feature from a given platform. Moreover, for a given feature, there may be many different ways to extract that feature from a given platform, each way having a different level of confidence. Thus, the process for extracting a given feature may include multiple different ways to extract the feature. The table of FIG. 4 is therefore provided for the purpose of illustrating a simplified explanation of what it means to relate features across multiple platforms and a platform-independent logical expression.

As can be seen from FIG. 4, a logical feature may be whether an application accesses the user's personal contacts on the device. This logical feature may be referred to as "USES_CONTACTS" in the platform-independent sense, and the logical feature may be assigned a value of 1 if the application accesses the device's personal contacts or assigned a value of 0 if it does not. The ANDROID-specific extractor may look at the permissions manifest for the application to see if either "android.permission.READ_CONTACTS" or "android.permission.WRITE_CONTACTS" is present therein. The iOS-specific extractor may look to see if the application utilizes the frameworks, "AddressBook.framework" or "AddressBookUI.framework."

Another exemplary logical feature may be to see if Bluetooth is used. This feature, which may be referred to as "USES_BLUETOOTH" may be determined in a manner similar to the approach discussed above for the "USES_CONTACTS" feature, but with different sets of permissions or frameworks.

Not all features may be identified by permissions and frameworks, however. As may be seen from the "USES_MICROPHONE" logical feature, there is no corresponding framework within iOS for using the microphone, and accordingly, the extractor may examine the symbols used in the symbol table and/or method names that are listed in the binary header file.

Figure 5:
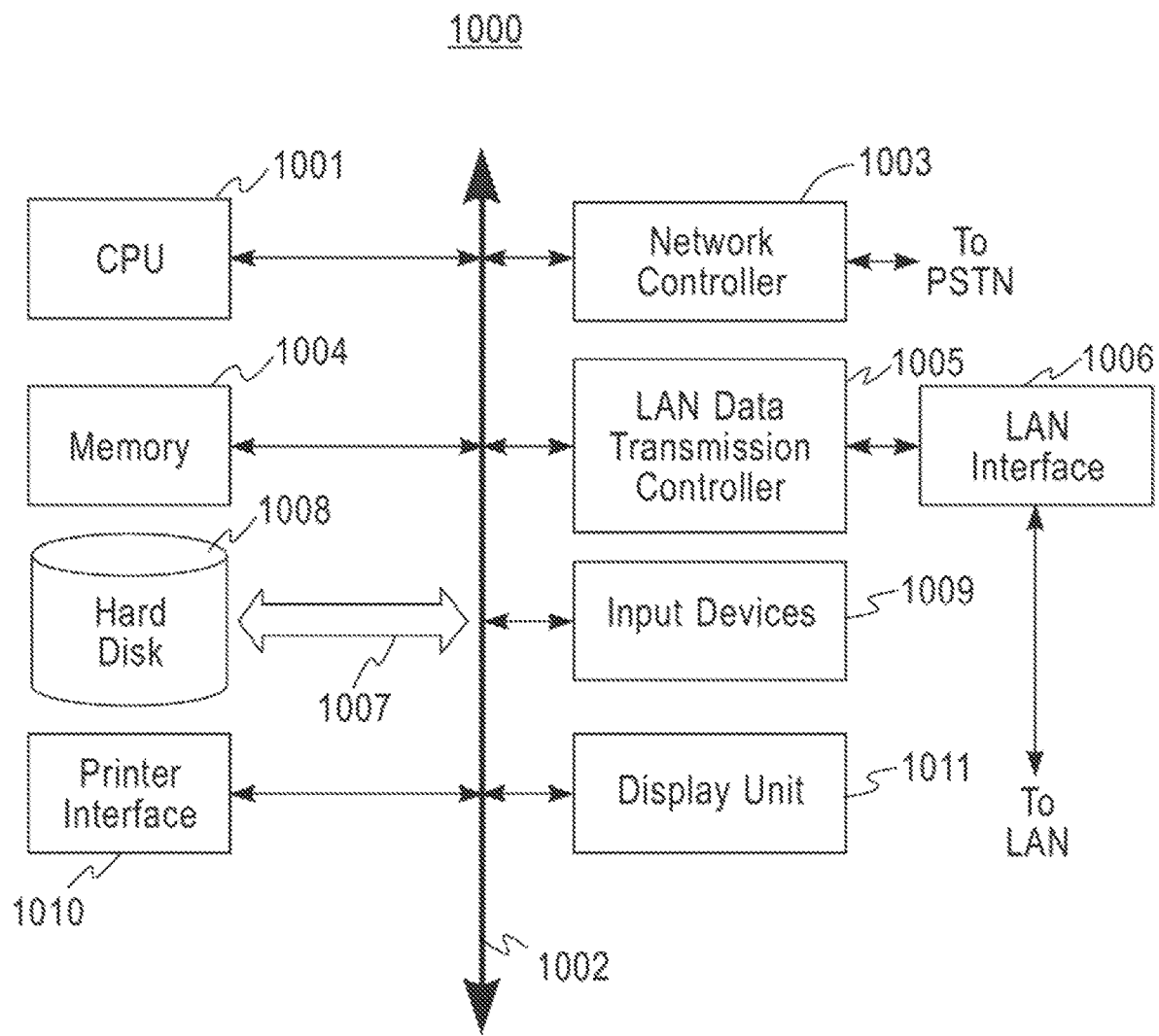
FIG. 5 shows an example of a computer system capable of implementing the method and apparatus according to embodiments of the present disclosure.

FIG. 5 shows an example of a computer system which may implement a method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for ca fig out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

What is claimed is:

1. A system for performing program analysis, comprising:
a first logical extractor software feature configured to receive a plurality of programs of a first platform that have been assigned a first label, receive a plurality of programs of the first platform that have been assigned a second label, convert each of the plurality of programs of the first platform that have been assigned the first label to a first set of platform-independent logical features, in a platform-independent form, that are universal to both the first platform and a second platform, wherein the first platform and the second platform represent different operating systems, and convert each of the plurality of programs of the first platform that have been assigned the second label to a second set of platform-independent logical features in the platform-independent form, that are universal to both the first and second platforms;

a computer learning trainer software feature configured to train a discriminatory model or classifier, using machine learning, based on the conversion of the programs of the first platform that have been assigned the first and second label as the first and second sets of platform-independent logical features, to distinguish between programs of the first label and programs of the second label;

a second logical extractor software feature configured to receive an unlabeled program of the second platform, and convert the unlabeled program to a third set of platform-independent logical features, of the platform-independent form;

a software tool, executed on a computer system, for analyzing a program, configured to use the trained discriminatory model or classifier to determine if the unlabeled program warrants the first label or the second label, based on the conversion of the unlabeled program as the third set of platform-independent logical features, after the unlabeled program has been converted to the third set of platform-independent logical features in the platform-independent form; and a mobile electronic device, of the second platform, having one or more applications installed thereon, wherein the mobile electronic device is configured to have the software tool analyze each of the plurality of applications stored thereon, wherein each of the platform-independent logical features represents a single program feature including an API call, a library used, a manner in which the Internet is accessed, or another program capability that has been converted from a platform-dependent program element.

2. The system of claim 1, thither comprising an application repository for storing, a plurality of applications for the second platform, wherein the application repository is configured to have the software tool analyze each of the plurality of applications stored therein.

3. The system of claim 1, wherein at least some platform-independent logical features of the first set of platform-independent logical features, the second set of platform-independent logical features, and the third set of platform-independent logical features are indications of what hardware resources are called.

4. A computer system comprising:
a processor; and
a non-transitory, tangible, program storage medium, readable by the computer system, embodying a program of instructions executable by the processor to perform method steps for performing program analysis, the method comprising:
receiving a plurality of programs of a first platform that have been assigned a first label;
receiving a plurality of programs of the first platform that have been assigned a second label;
converting each of the plurality of programs of the first platform that have been assigned the first label to a first set of platform-independent logical features, in a platform-independent form, that are universal to both the first platform and a second platform, wherein the first platform and the second platform represent different operating systems;
converting each of the plurality of programs of the first platform that have been assigned the second label to a second set of platform-independent logical features, in the platform-independent form;

training a discriminatory model or classifier, using machine learning, based on the conversion of the programs of the first platform that have been assigned the first and second label as the first and second sets of platform-independent logical features, to distinguish between programs of the first label and programs of the second label;

receiving an unlabeled program of the second platform;
converting the unlabeled program to a third set of platform-independent logical features, in the platform-independent form; and
using the trained discriminatory model or classifier to determine if the unlabeled program warrants the first label or the second label, based on the conversion of the unlabeled program as the third set of platform-independent logical features, after the unlabeled program has been converted to the third set of platform-independent logical features in the platform-independent form,
wherein each of the platform-independent logical features represents a single program feature including an API call, a library used, a manner in which the Internet is accessed, or another program capability that has been converted from a platform-dependent program element.

5. The computer system of claim 4, further comprising:
receiving a plurality of programs of the second platform that have been assigned the first label;
receiving a plurality of programs of the second platform that have been assigned the second label;
converting each of the plurality of programs of the second platform that have been assigned the first label to a fourth set of platform-independent logical features; and
converting each of the plurality of programs of the second platform that have been assigned the second label to a fifth set of platform-independent logical features,
wherein the training of the discriminatory model or classifier further includes using machine learning; based on the conversion of the programs of the second platform that have been assigned the first and second label as the fourth and fifth sets of platform-independent logical features, to distinguish between programs of the first label and programs of the second label.

6. The computer system of claim 4, wherein the first label represents malicious programming and the second label represents benign programming.

7. The computer system of claim 5, additionally comprising:
receiving a plurality of programs of a third platform, different from the first and second platforms, that have been assigned the first label;
receiving a plurality of programs of the third platform that have been assigned the second label;
converting each of the plurality of programs of the third platform that have been assigned the first label to a sixth set of platform-independent logical features; and
converting each of the set of programs of the third platform that have been assigned the second label to a seventh set of platform-independent logical features,
wherein the training of the discriminatory model or classifier further includes using machine learning, based on the conversion of the programs of the third platform that have been assigned the first and second label as the sixth and seventh sets of platform-independent logical features, to distinguish between programs of the first label and programs of the second label.

8. The computer system of claim 7, further including, receiving a plurality of programs of the first platform that have been assigned a third label; and converting each of the plurality of programs of the first platform that have been assigned the third label to an eighth set of platform-independent logical features, wherein the training of the discriminatory model or classifier further includes, using machine learning, based on the conversion of the programs of the first platform that have been assigned the first, second, and third labels, to the first, second, and eighth sets of platform independent logical features, to distinguish between programs of the first, second, and third labels.

9. The computer system of claim 4, wherein at least some platform-independent logical features of the first set of platform-independent logical features, the second set of platform-independent logical features, and the third set of platform-independent logical features are indications of what hardware resources are called.

\* \* \* \* \*